US005339985A

United States Patent [19]

Perez

[11] Patent Number: 5,339,985

[45] Date of Patent: Aug. 23, 1994

[54] COIN OPERATED DISPENSING MACHINE

[76] Inventor: Hector Perez, 1946 NW. 93 Ave., Miami, Fla. 33172

[21] Appl. No.: 139,853

[22] Filed: Oct. 22, 1993

[51] Int. Cl.[5] .............................................. B65G 59/00

[52] U.S. Cl. .................................... 221/151; 221/121; 194/248

[58] Field of Search ............... 221/121, 120, 119, 151, 221/248, 249, 268, 274, 271; 194/248

[56] References Cited

U.S. PATENT DOCUMENTS 2,653,850 9/1953 Vollten ................................ 221/151

4,702,392 10/1987 Rachman ............................ 221/151

FOREIGN PATENT DOCUMENTS 714389 7/1965 Canada ................................ 194/248

*Primary Examiner*—Kenneth W. Noland

*Attorney, Agent, or Firm*—Robert M. Downey

[57] ABSTRACT

A coin operated product dispensing machine including a housing with an enclosed main display compartment and an elongate slide plate extending therethrough and attached at one end to the housing with a biasing element, an opposite free end of the slide plate extending outwardly from a front wall of the housing and defining a pull handle, wherein the slide plate is movable between a relaxed position and an extended position by pulling the handle at the free end thereof. A carousel, including vertically oriented chambers for containing a stacked array of individual product units therein, is rotatably supported within the main display compartment such that each of the chambers is selectively positionable in vertical alignment over a drop hole in the slide plate, the drop hole being sized and configured to receive an individual, lower most product unit dropped from the aligned chamber. A coin released lock mechanism, structured to accept a predetermined size coin and reject other size coins, releases the slide plate for outward movement to the extended position, causing the individual product unit within the drop hole to be carried from below the chamber to a drop chute where it is deposited thereon and dispensed to a user.

7 Claims, 2 Drawing Sheets

COIN OPERATED DISPENSING MACHINE

BACKGROUND OF THE INVENTION

1. Field of the Invention

The present invention relates to coin operated machines for dispensing an individual product unit upon depositing a particular size coin therein to release a manually operated dispensing mechanism.

2. Description of the Related Art

A variety of coin operated machines for dispensing a wide range of products are known in the vending machine art. Some of these machines are more simple, such as the well known gum ball machine which dispenses a single product unit, a gum ball, from a container filled with gum balls. For the most part, these less sophisticated machines do not allow the user to choose from a variety of flavors or product types. Rather, a single product, usually not visible to the consumer, is randomly released from the bottom of the container upon depositing a particular coin, such as a quarter, and manually operating a mechanism which releases a single product unit from the container. Other vending machines are much more sophisticated, allowing the user to choose among a variety of products by entering a particular code on a key pad which activates an electronical dispensing mechanism to release the selected product for retrieval by the consumer. While these type of vending machines are very useful and convenient to consumers, they are usually very large and quite expensive. Therefore, use of these type of machines is limited to high volume commercial vending in locations where there is a significant demand for snacks and refreshments. Ordinarily, these more sophisticated vending machines are used in replacement of a refreshment stand or snack bar, eliminating the need for full-time attendance by one or more employees. Regardless of whether the vending machine is of the simple gum ball type or the more complicated electronically controlled type, the above described machines are primarily designed for the purpose of selling a product.

Aside from vending machines which are primarily designed for the purpose of selling a product, there exists various devices which are designed to solicit charitable donations, and in exchange for a donation, the donator may take a piece of candy or other token item. One of the most commonly known type of charity collection devices is an honor box. In most instances, an honor box has two compartments, including one for receipt of donations and another for holding give-away items such as pieces of candy. Typically, a person making a donation would deposit any desired denomination of currency through a slot in the money receiving compartment and thereafter remove one piece of candy. A problem arises, however, when dishonest people take candy without making a donation. Still, others take more than one piece when making a relatively small donation. It is called an honor box because the donator is supposed to be on their "honor" when making a donation. Unfortunately, in this day and age, there are too many dishonorable people for such a system to work effectively.

There presently exists various coin-operated dispensing machines which are primarily designed to dispense disc-shaped products. These machines are primarily intended for use in soliciting charitable contributions, while eliminating some of the problems associated with the typical "honor boxes". While these dispensing machines include a rotating carousel which is similar in structure to that of the present invention, the coin release mechanisms of these machines are entirely different. Unlike the coin release mechanism of the present invention, these machines are not structured to accept a particular size coin and reject all other size coins. Some of these machines use a magnetic connection in the coin release mechanism which is broken by contact with any size coin. The present invention is specifically designed to eliminate this problem.

Accordingly, in spite of the numerous existing product dispensing machines in the related art, there still exists a need for a simple, attractive, low cost countertop product dispensing machine which is ideally suited for collecting charitable donations at a check-out or cashier's counter in exchange for a candy product or other low cost item.

SUMMARY OF THE INVENTION

The present invention relates to a coin operated dispensing apparatus for dispensing individual units of a product or products, selected by the user. The apparatus is specifically structured to be portable so that it may be conveniently placed on the cashier counter of a convenience store, food mart, movie theater, bowling alley and the like.

The dispensing machine is comprised of a housing including a front wall, a rear wall, opposite side walls, a removable top lid and a base. The housing further includes a vertical interior wall dividing the interior of the housing so as to define a main display compartment in a forward portion of the housing and a coin receiving compartment in a rear portion of the housing. A horizontal floor in the main display compartment is disposed in parallel, spaced relation above the base of the housing and includes a recessed channel formed therein, adapted to receive an elongate slide plate in sliding relation therein. The slide plate includes a first free end extending outwardly from the front wall of the housing, exteriorly thereof, and defining a pull handle. The slide plate further includes an opposite second end attached to the housing with a spring element, the slide plate being movable between a relaxed position and an extended position, wherein the free end is pulled outwardly from said front wall. A drop hole is formed through a mid portion of the slide plate, normally positioned within the recessed channel of the floor in the main display compartment. The drop hole is specifically sized and configured to receive a single product unit therein, whereupon movement of the slide plate serves to move the product unit held within the drop hole relative to the housing. A drop chute is located exteriorly of the main display compartment adjacent the front wall and below the free end of the slide plate. Upon pulling the slide plate outwardly, a product unit held within the drop hole is moved outwardly until it is over the drop chute, at which point the floor of the housing terminates causing the product unit to be dropped down onto the drop chute where it is accessible to the consumer.

A carousel is rotatably supported within the main display compartment between the floor and the lid of the housing. The carousel includes a plurality of vertically oriented chambers, each structured and disposed to hold the individual product units in a vertically stacked array. Preferably, the front wall, side walls and vertical chambers of the carousel are transparent so that the product units contained within the chambers are fully visible to the consumer. A handle on the top lid interconnects with the carousel to facilitate manual rotation of the carousel and vertical chambers. Upon rotation of the carousel, a stop element serves to sequentially align each of the vertical chambers above the drop hole of the slide plate such that a lowermost product unit in the respectively align carousel is dropped into position in the drop hole. In this manner, when a particular chamber has been emptied, the carousel can be rotated so that a next succeeding chamber having product units therein can be aligned with the drop hole to release a product unit into position for dispensing.

A coin operated release normally maintains the slide plate locked in the relaxed position, preventing outward sliding movement to the extended position and thereby preventing dispensing of the product units. The coin operated release includes a slide plate lock means which is structured to lockingly engage the slide plate in the relaxed position so as to prevent outward sliding movement thereof.

A coin receipt means includes a cradle on the slide plate structured and disposed to receive a coin therein. The coin receipt means further includes a coin track extending vertically within the coin receiving compartment between a coin slot in the top lid of the housing and the cradle on the slide plate. The coin track is specifically structured and disposed to guide a coin deposited through the coin slot downwardly into position in the cradle. The slide plate lock means cooperates with the cradle so as to capture and maintain a predetermined size coin within the cradle, permitting other size coins to pass therethrough. Once the predetermined size coin is captured within the cradle, the outward movement of the slide plate causes forced engagement of the coin with the slide plate lock means, moving the slide plate lock means out of locked engagement with the slide plate and permitting the slide plate to be moved to the fully extended position so that the drop hole is positioned over the dispensing chute.

The removable lid may be provided with lock means to prevent removal of the lid by unauthorized persons who might otherwise gain access to the products contained within the main display compartment. A coin tray may be further provided in the housing, between the base and the floor to catch coins from the coin receipt means.

With the foregoing in mind, it is a primary object of the present invention to provide a coin operated dispensing machine for dispensing individual units of a select product to a consumer, wherein the particular product unit to be dispensed is fully visible to the consumer prior to operation of the machine.

It is a further object of the present invention to provide a coin operated product dispensing apparatus which may be conveniently located at the cashier counter of a convenience store, food mart, bowling alley, dry cleaners, movie theater and the like.

It is still a further object of the present invention to provide a coin operated product dispensing apparatus for use in collecting contributions to a particular charity.

It is still a further object of the present invention to provide a coin operated product dispensing apparatus for use in raising capital for charitable causes, wherein the product dispensing apparatus is specifically designed to eliminate the problems normally associated with honor type charity collection boxes, and which is further structured to accept a predetermined size coin and reject all other size coins.

It is yet a further object of the present invention to provide a coin operated product dispensing apparatus which is highly attractive, portable, lightweight and yet relatively inexpensive to manufacture.

These and other objects and advantages of the present invention will be more readily apparent in the description which follows.

BRIEF DESCRIPTION OF THE DRAWINGS

For a fuller understanding of the nature of the present invention, reference should be had to the following detailed description taken in connection with the accompanying drawings in which:

FIG. 5(*b*) is an isolated top plan view of the slide plate and lock means, with no coin placed therein illustrating locking engagement of the slide plate lock means with the slide plate.

FIG. 5(*c*) is an isolated top plan view of the slide plate and slide plate lock means with a coin received in a cradle thereof.

FIG. 5(*d*) is an isolated top plan view of the slide plate and lock means illustrating engagement of the coin with the lock means to effectively release the slide plate.

FIG. 5(*e*) is an isolated top plan view of the slide plate and lock means illustrating return of the lock means to a locking position upon release of the coin from the cradle.

Like reference numerals refer to like parts throughout the several views of the drawings.

DETAILED DESCRIPTION OF THE PREFERRED EMBODIMENT

Figure 1:
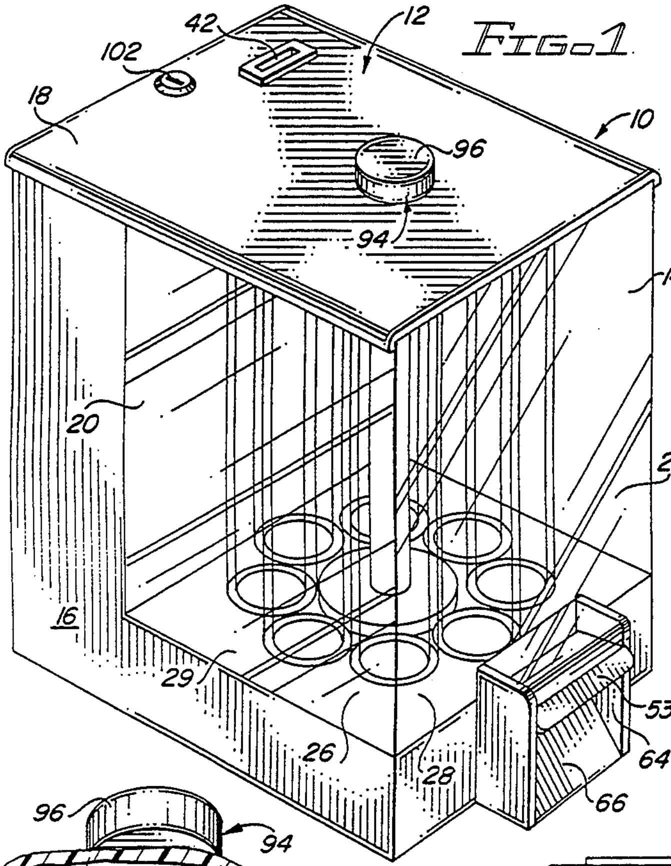
FIG. 1 is a perspective view of the dispensing apparatus of the present invention.
Figure 6:
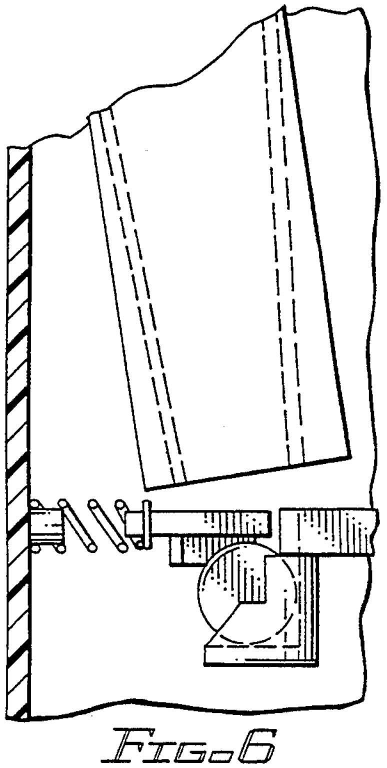
FIG. 6 is an isolated view of the coin receipt means of the present invention.
Figure 2:
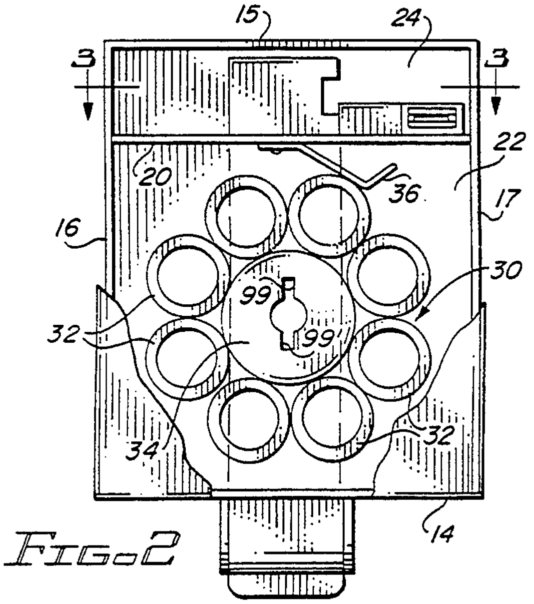
FIG. 2 is a top plan view of the dispensing apparatus shown with the lid partially cut away.
Figure 3:
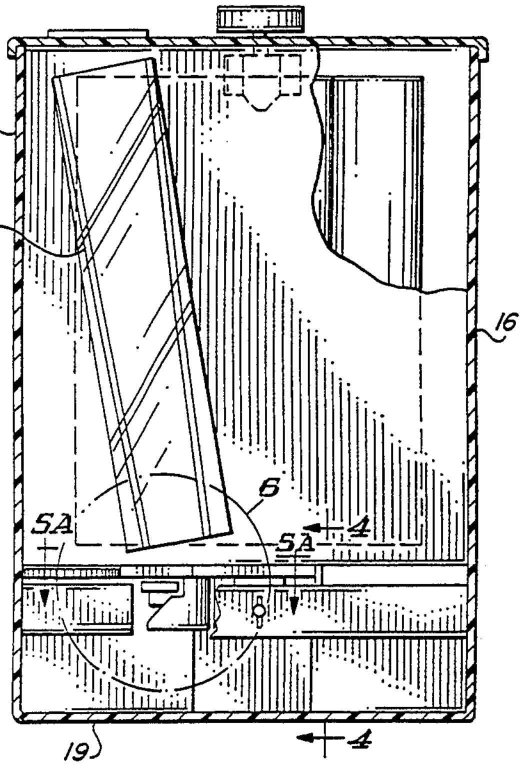
FIG. 3 is a sectional view taken along the plane of the line indicated by the arrows 3—3 of FIG. 2.

Referring initially to FIGS. 1–3, the dispensing apparatus of the present invention, generally indicated as 10, is illustrated. The dispensing apparatus 10 includes a housing 12 including a front wall 14, an rear wall 15, opposite side walls 16, 17, a removable top lid 18 and bottom 19. An interior, vertically oriented dividing wall 20 extends transversely between the opposite side wall 16 an 17 so as to divide the interior of the housing between a forward main display compartment 22 and a rearward coin receiving compartment 24. The main display compartment 22 is surrounded on three sides by transparent windows, such as 26 and 28 which form a portion of the opposite side walls and front wall. The transparent windows, 26, 28 extend down from the top lid 18 to a horizontally disposed floor 29 which defines a bottom of the main display compartment 22.

A carousel 30 is rotatably supported within the main display compartment 22 and includes a plurality of vertically oriented hollow tubular members defining product chambers 32. The product chambers 32 are each specifically structured and disposed to contain a stacked array of individual product units, such as candy mint patties, therein. The product chambers 32 are fixedly attached about a central core structure 34. The central core 34 is pivotally supported within the main display compartment 22 so as to facilitate rotation of the carousel, including each of the product chambers 32 about a central vertical axis. A stopper element 36 is attached to the dividing wall 20 and extends into the main display compartment 22 so as to engage the product chambers 32 as the carousel 30 is rotated. The stopper element 36 is specifically structured to ride about the outer surface of the product chambers 32 as the carousel 30 is rotated, falling between adjacent product chambers 32 in a relaxed state so as to define one of a plurality of stop positions of the product chambers 32 as the carousel is rotated.

A coin track 40 extends vertically between a coin slot 42 in the top lid 18 and a coin released dispensing mechanism to be described in more detail hereinafter. The coin track is specifically designed to guide a coin deposited in the coin slot 42 downwardly to the dispensing mechanism.

Figure 4:
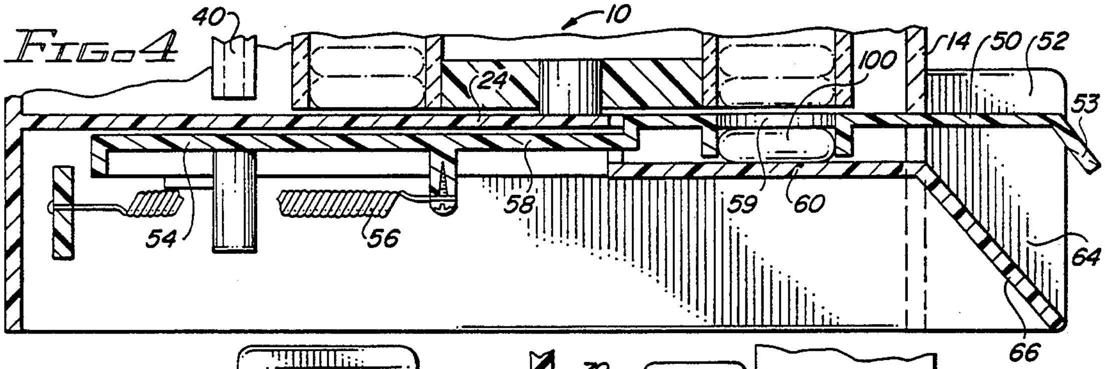
FIG. 4 is a partial side elevation, in section, of a lower portion of the dispensing apparatus.
Figure 5A:
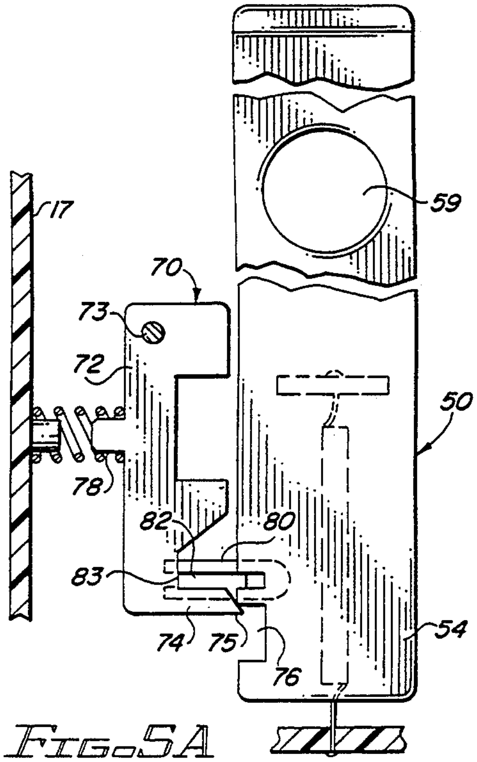
FIG. 5(*a*) is an isolated top plan view of a slide plate and slide plate lock means of the present invention shown in a relaxed position.
Figure 5B:
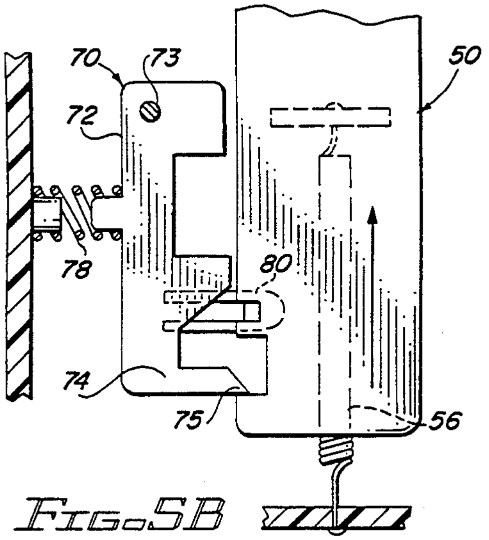
Figure 5C:
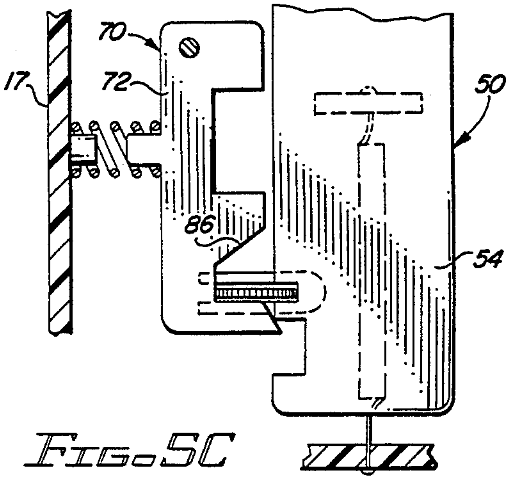
Figure 5D:
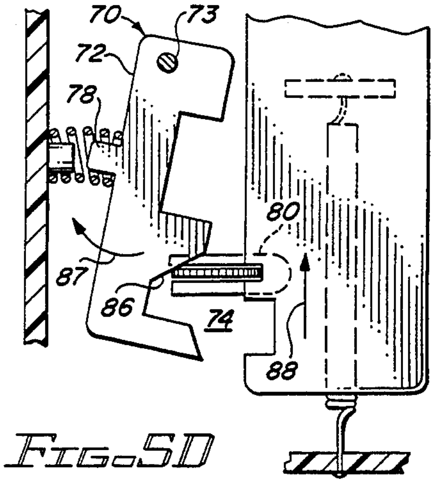
Figure 5E:
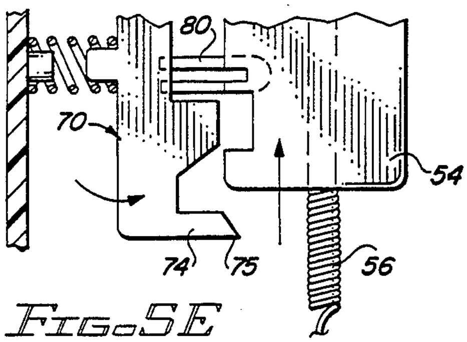

The dispensing mechanism includes an elongate slide plate 50, as shown in FIGS. 4–5(*e*). The slide plate 50 includes a first free end zone 52 extending exteriorly out through the front wall 14 of the housing 12. The free end zone 52 includes a downwardly oriented tab portion 53 defining a pull handle to facilitate pulling said slide plate outward relative to the housing 12. An opposite end zone 54 is disposed within the housing, normally below the coin receiving compartment. The slide plate 50 is attached to the housing 12 by a spring 56, or other like biasing element, causing the slide plate to be normally pulled inwardly defining a relaxed position. A mid portion 58 of the slide plate 50 includes a drop hole 59 therethrough being sized and configured for receipt of a lowermost individual product unit 100 contained within a product chamber 32 disposed in aligned relation above the drop hole. Accordingly, the stopper element 36 is specifically structured to cause each of the product chambers 32 to be stopped at a position in vertical alignment above the drop hole upon rotation of the carousel. In this manner, when a product chamber 32 has been completely emptied, the carousel is rotated until a next chamber 32 having product therein is disposed in vertical alignment over the drop hole 59 in the slide plate 50. Pulling outwardly on the handle 53, against the force of the spring 56, serves to move the slide plate 50 outwardly such that the product unit 100 contained within the drop hole 59 is caused to be moved along a horizontal slide surface 60 below the floor surface 29 channel, defining a recessed in the floor 29 for sliding passage of the slide plate 50. Continued outward movement of the slide plate 50 caused the product unit 100 to be moved outwardly to a drop chute 64 at which point the product 100 is deposited on a drop chute slide 66 for delivery to the user.

Ordinarily, the slide plate 50 is locked in the relaxed position, preventing outward movement thereof when pulling on handle 53. Thus, product units 100 contained within the carousel cannot be dispensed without first depositing a particular size coin in the coin slot 42. Referring to FIGS. 5(*a*) through 5(*b*), a slide plate lock means, generally indicated as 70, is illustrated. The slide plate lock means 70 includes a lever 72 pivotally supported at pivot point 73 within the lower portion of the housing 12 adjacent the second end zone 54 of the slide plate 50. A spring element 78 connecting between the lever 72 and side wall 17 of the housing maintains the lever 72 in a rest position, as seen in FIG. 5(*a*), absent any force applied thereon. A finger 74 on the lever 72 opposite the pivot point 73 is structured and disposed to be normally positioned such that a distal tip 75 thereof extends within a notch 76 formed in the second end zone 54 of the slide plate 50. In this manner, upon outward movement of the slide plate 50 the distal tip 75 on the lever 72 engages a surface within the notch 76, as illustrated in FIG. 5(*b*) preventing further outward movement of the slide plate 50 and dispensing of the product unit 100.

A cradle 80 attached to the second end zone 54 of the slide plate 50 is normally positioned directly below the coin track 40 and is structured and disposed for receipt of a coin dropped through the coin slot 42 and down the coin track 40. The cradle 80 cooperates with the lever 72 of the slide plate lock means 70 to capture a particular size coin, preferably a quarter, therein. Smaller coins, such as pennies, nickels and dimes will pass through the cradle 80 as they are of a lesser diameter than the length of a slot 82 extending through the cradle 80 and closed at one end by an edge 83 of the lever 72. Upon depositing the proper size coin through the coin slot 42, the coin is captured in the cradle 80, as shown in FIG. 5(*c*). Essentially, the lever 72 is holding the coin within the cradle when the lever 72 is in the rest position. Once the coin is within the cradle 80, as seen in figure (c), outward movement of the slide plate 50 causes an edge of the coin to engage a cam surface 86 of the lever 72 causing movement of the lever 72 in the direction of arrow 87, as seen in FIG. 5(*d*). Continued outward movement of the slide plate 50 in the direction of arrow 88 causes the coin held within the cradle 80 to be moved along the length of the lever 72, eventually reaching a cutout zone 90 in the lever 72, at which point the edge of the coin no longer engages the lever 72 and thus falls through the bottom of the cradle 80. Once the coin is dropped, the spring 78 forces the lever 72 to its initial rest position. Subsequent release of the handle 53 of the slide plate 50 results in spring 56 pulling the slide plate 50 the relaxed position as seen in FIG. 5(*a*). Subsequent outward movement of the slide plate 50 is thus prevented until such time as a proper size coin is received within the cradle 80.

Figure 7:
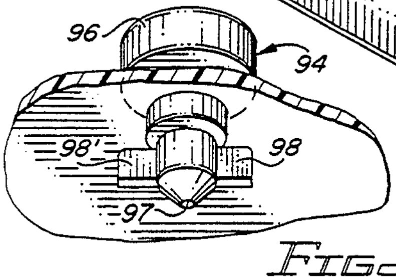
FIG. 7 is an isolated view, shown in perspective, of a carousel rotating knob of the present invention.

Referring to FIG. 7, a carousel rotating control 94 is shown including a knob 96 disposed on an exterior of the top lid 18 and a carousel engaging means 97 extending below an underside surface of the lid 18. The carousel engaging means 97 includes opposite wing portions 98, 98′ adapted for driving receipt within corresponding slots 99, 99′ formed in the central core structure 34 of the carousel 30. In this manner, when the lid 18 is placed in covering relation to the main display compartment 22, the carousel engaging portion 97 is fitted within the central core structure 34 of the carousel 30, whereupon manual rotation of the knob 96 serves to drivingly rotate the carousel 30 including the product chambers 32.

The top lid 18 is removable from a remainder of the housing 12 to facilitate cleaning of the interior of the housing and replacement of product units within the product chambers 32. Lock means 102 may be provided on the lid 18 to prevent unauthorized removal of the lid 18.

Now that the invention has been described,

What is claimed is:

1. A coin operated dispensing apparatus for dispensing individual units of a select product, said apparatus comprising:

a housing including a front wall, a rear wall, opposite side walls, a top lid and a base, said housing further including a vertical interior dividing wall extending transversely between said opposite side walls and defining a main display compartment in a forward portion of said housing and a coin receiving compartment in a rear portion of said housing, a floor in said main display compartment horizontally disposed in parallel relation to said base, and including a longitudinal, recessed channel therein, an elongate slide plate movably fitted to said housing and including a first free end zone extending outwardly from said front wall defining a pull handle, and an opposite second end zone disposed within said housing, said slide plate attached to said housing with a biasing element and extending horizontally through said housing within said recessed channel and including a mid portion disposed within said recessed channel and coplanar with said floor, said mid portion including a drop hole formed therethrough, said slide plate being movable between a relaxed position and an extended position causing said drop hole to move relative to said floor, said extended position defined by said drop hole being disposed exteriorly of said main display compartment, a carousel rotatably supported within said main display compartment and including a plurality of vertically oriented chambers structured and disposed to hold the individual product units in a vertically stacked array, said chambers being selectively rotatable about a common central axis, each of said chambers being structured and disposed for individual alignment over said drop hole upon rotation of said carousel causing a lower most one of the individual product units in the respective, vertically aligned chamber to fall into a dispensing position within said drop hole of said slide plate, coin receipt means including a cradle on said slide plate and a coin track extending within said coin receiving compartment between a coin slot in said top lid of said housing and said cradle, said coin track being structured and disposed to guide a coin deposited through said coin slot downwardly into said cradle, slide plate lock means structured to lockingly engage said slide plate in said relaxed position preventing outward sliding movement thereof to said extended position, said slide plate lock means cooperating with said cradle to capture a predetermined size coin within said cradle and permitting other size coins to pass therethrough, said slide plate lock means being further structured to release said slide plate upon outward movement of said slide plate causing forced engagement of said slide plate lock means with said predetermined size coin captured in said cradle and subsequent movement of said slide plate lock means out of locked engagement with said slide plate upon continued outward movement of said slide plate, said slide plate lock means being structured to release said coin from said cradle upon disengagement with said slide plate and continued outward movement thereof to said extended position, said slide plate lock means being further structured to reengage said slide plate in locked engagement upon return of said slide plate to said relaxed position, a dispensing chute extending from said front wall, exteriorly of said display chamber and below said slide plate and structured to deliver the individual product units dropped thereon, and whereby movement of said slide plate to said extended position causes said product unit in said drop hole to be dropped onto said dispensing chute for delivery to the user.

2. A dispensing apparatus as set forth in claim 1 further including stopper means structured and disposed for stopping said chambers in individual vertical alignment over said drop hole upon rotation of said carousel.

3. A dispensing apparatus as set forth in claim 2 further including manually operated carousel rotation control means.

4. A dispensing apparatus as set forth in claim 3 wherein said carousel rotation control means includes a knob exteriorly accessible on said top lid and a carousel engaging means extending downwardly therefrom through said top lid and into driving engagement with said carousel.

5. A dispensing apparatus as set forth in claim 1 wherein said slide plate lock means includes a lever pivotally supported within said housing adjacent said opposite second end zone of said slide plate and normally maintained in a locked position by a spring element connecting between said lever and said housing.

6. A dispensing apparatus as set forth in claim 5 wherein said lever includes a finger thereon normally disposed in locked engagement with said second end zone of said slide plate.

7. A dispensing apparatus as set forth in claim 6 wherein said lever further includes a cam surface thereon structured and disposed for forced engagement with an edge of said predetermined size coin upon outward, forced movement of said slide plate, causing said lever to be moved against said spring element and releasing said finger from said locked engagement with said slide plate, and thereby allowing continued outward movement of said slide plate.

* * * * *